(12) United States Patent
Smith et al.

(10) Patent No.: US 7,568,728 B2
(45) Date of Patent: Aug. 4, 2009

(54) INFLATOR DEVICE HAVING MODULAR CONSTRUCTION AND RADIAL INFLATION GAS FLOW

(75) Inventors: Bradley W. Smith, Plain City, UT (US); Matthew A. Cox, Centerville, UT (US); David W. Parkinson, North Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 266 days.

(21) Appl. No.: 11/440,886

(22) Filed: May 25, 2006

(65) Prior Publication Data

US 2007/0273131 A1 Nov. 29, 2007

(51) Int. Cl.
 *B60R 21/26* (2006.01)
(52) U.S. Cl. ...................... 280/736; 280/741
(58) Field of Classification Search .................. 280/736, 280/737, 741, 742
 See application file for complete search history.

(56) References Cited

U.S. PATENT DOCUMENTS

| | | | |
|---|---|---|---|
| 6,149,193 | A | 11/2000 | Canterberry et al. |
| 6,189,927 | B1 | 2/2001 | Mossi et al. |
| 6,254,124 | B1 | 7/2001 | Angermaier |
| 6,314,888 | B1 | 11/2001 | Muller et al. |
| 6,880,853 | B2 | 4/2005 | Watase et al. |
| 6,886,855 | B2 | 5/2005 | Cheal et al. |
| 6,966,578 | B2 | 11/2005 | Smith |
| 2006/0091660 | A1 | 5/2006 | Lang et al. |
| 2006/0249938 | A1* | 11/2006 | Matsuda et al. ............. 280/736 |

FOREIGN PATENT DOCUMENTS

JP 2005035417 2/2005

OTHER PUBLICATIONS

Drawing Autoliv APPS-1, available before May, 24 2005.
Drawing Autoliv APPS-3, available before May 24, 2005.
U.S. Appl. No. 11/440,976, filed May 2006, Smith et al.

* cited by examiner

*Primary Examiner*—Ruth Ilan
(74) *Attorney, Agent, or Firm*—Sally J Brown; Pauley Petersen & Erickson

(57) ABSTRACT

A modular inflator device for inflating an inflatable cushion of an inflatable cushion restraint system. The inflator device has an elongated cylindrical configuration and includes a supply of gas generant material to produce inflation gas upon reaction initiation. The inflator device includes a reaction housing defining a reaction chamber containing the supply of gas generant material. An initiator device is connected to the reaction housing and in reaction initiating communication with the supply of gas generant material. The reaction housing includes a plurality of radially oriented chamber discharge openings. Upon reaction initiation of the supply of gas generant material, the inflation gas discharges from the reaction chamber through the discharge openings. An initiator diffuser is disposed between the initiator device and the supply of gas generant material. The initiator diffuser includes a plurality of radially oriented diffuser discharge openings disposed in discharge orientation toward the reaction housing side wall. The reaction housing is connected to a filter housing, and a filter element is disposed within the filter housing and external of the reaction chamber.

20 Claims, 7 Drawing Sheets

INFLATOR DEVICE HAVING MODULAR CONSTRUCTION AND RADIAL INFLATION GAS FLOW

BACKGROUND OF THE INVENTION

This invention relates generally to the providing or supplying of inflation gas and, more particularly, to the providing or supplying of such inflation gas via an elongated inflator such as may be desired for certain inflatable passive restraint systems for use in vehicles for restraining the movement of an occupant in the event of a vehicular collision.

It is well known to protect a vehicle occupant by means of safety restraint systems which self-actuate from an undeployed to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In practice, such airbag cushions are typically designed to inflate or expand with gas when the vehicle encounters a sudden deceleration, such as in the event of a collision. Such airbag cushions may desirably deploy into one or more locations within the vehicle between the occupant and certain parts of the vehicle interior, such as the doors, steering wheel, instrument panel or the like, to prevent or avoid the occupant from forcibly striking such parts of the vehicle interior. For example, typical or customary vehicular airbag cushion installation locations have included in the steering wheel, in the dashboard on the passenger side of a car, along the roof line of a vehicle such as above a vehicle door, and in the vehicle seat such as in the case of a seat-mounted airbag cushion. Other airbag cushions such as in the form of knee bolsters and overhead airbags also operate to protect other or particular various parts of the body from collision.

In addition to an airbag cushion, inflatable passive restraint system installations also typically include a gas generator, also commonly referred to as an "inflator." Upon actuation, such an inflator device desirably serves to provide an inflation fluid, typically in the form of a gas, used to inflate an associated airbag cushion. Various types or forms of inflator devices have been disclosed in the art for use in inflating an inflatable restraint system airbag cushion.

One particularly common type or form of inflator devices used in inflatable passive restraint systems is commonly referred to as a pyrotechnic inflator. In such inflator devices, gas used in the inflation of an associated inflatable element is derived from the combustion of a pyrotechnic gas generating material.

Another known type of compressed gas inflator is commonly referred to as a "hybrid" inflator. In such an inflator device, inflation gas results from a combination of stored compressed gas and the combustion of a gas generating material, e.g., a pyrotechnic.

In view of possibly varying operating conditions and, in turn, possibly varying desired performance characteristics, there is a need and a desire to provide what has been termed an "adaptive" inflator device and a corresponding inflatable restraint system. With an adaptive inflator device, output parameters such as one or more of the quantity, supply, and rate of supply (e.g., mass flow rate) of inflation gas, for example, can be selectively and appropriately varied dependent on selected operating conditions such as ambient temperature, occupant presence, seat belt usage and rate of deceleration of the motor vehicle, for example.

While such adaptive systems are desirable, they typically require the inclusion of additional components as a part of the associated inflator device and such as may undesirably increase one or more of the size, cost and weight of the inflator device. For example, various proposed or available dual stage inflator devices appear based on the principle of packaging together two separate gas generating inflators that can be actuated simultaneously or at a desired time interval. There is an on-going need for a more efficient and cost-effective adaptive inflator.

SUMMARY OF THE INVENTION

A general object of the invention is to provide an improved inflator device for use in inflatable safety restraint systems.

A more specific objective of the invention is to overcome one or more of the problems described above.

The general object of the invention can be attained, at least in part, through an improved inflator device for inflating an inflatable cushion of an inflatable cushion restraint system. The inflator device has an elongated cylindrical configuration and includes a supply of gas generant material to produce inflation gas upon reaction initiation. The inflator device includes a reaction housing with a reaction housing side wall, a reaction housing first end wall adjacent the side wall, and a reaction housing second end wall adjacent the side wall and opposite the reaction housing first end wall. The reaction housing defines a reaction chamber containing the supply of gas generant material.

An initiator device is connected to the reaction housing first end wall. The initiator device is in reaction initiating communication with the supply of gas generant material. The reaction housing side wall includes a plurality of radially oriented chamber discharge openings. Upon reaction initiation of the supply of gas generant material, the inflation gas discharges from the reaction chamber through the discharge openings. An initiator diffuser is disposed between the initiator device and the supply of gas generant material. The initiator diffuser includes a plurality of radially oriented diffuser discharge openings disposed in discharge orientation toward the reaction housing side wall.

Compared to the inflator device of the invention, the prior art generally fails to describe or provide adaptive inflator devices having a modular construction and which provide as efficient as desired assembly while also providing desirably improved inflation gas flow characteristics.

The invention further comprehends an inflator device for an inflatable cushion restraint system. The inflator device includes a filter housing with a filter housing side wall, a filter housing first end, and a filter housing second end opposite the filter housing first end. The filter housing at least in part defines a filter chamber. A first reaction housing defines a first reaction chamber containing a first supply of gas generant material. The first reaction housing is disposed at the filter housing first end and at least a portion of the first reaction housing is disposed in the filter chamber at the filter housing first end.

A first initiator device is in reaction initiating communication with the first supply of gas generant material. A second reaction housing defines a second reaction chamber containing a second supply of gas generant material. The second reaction housing is disposed at the filter housing second end and at least a portion of the second reaction housing is disposed in the filter chamber at the filter housing second end. The second initiator device is in reaction initiating communication with the second supply of gas generant material.

A filter element is disposed in the filter chamber, and external and between the first and second reaction housings. The first reaction housing includes a portion of a first reaction housing side wall aligned with and spaced apart from a portion of the filter housing side wall to form an inflation gas passage therebetween. A portion of the first reaction housing side wall includes a plurality of radially oriented discharge openings connecting the first reaction chamber and the inflation gas passage. Upon reaction initiation of the first supply of gas generant material to produce inflation gas, the inflation gas exits the first reaction chamber through the discharge openings, enters the inflation gas passage, and passes through the filter element.

As used herein, references to "discharge orientation" are to be understood to refer to a positioning of an opening toward an element such that a reaction product or inflation gas discharging through the opening is generally discharged in a direction toward or generally perpendicular to the element.

The inflator device of this invention is available for use in various inflatable cushion restraint system, such as a driver side or a passenger side inflatable cushion restraint system.

Other objects and advantages will be apparent to those skilled in the art from the following detailed description taken in conjunction with the appended claims and drawings.

BRIEF DESCRIPTION OF THE DRAWINGS

FIGS. 1 and 2 are sectional views of the inflator device. FIG. 3 is an exploded view of the inflator device. FIG. 4 illustrates an initiator device of the inflator device upon actuation

DETAILED DESCRIPTION OF THE INVENTION

The present invention provides an inflator device. In one embodiment of this invention, the inflator device has a modular construction. For example, one or more inflation gas producing reaction chambers are preassembled and combined with a filter housing during final assembly. Modular construction according to one embodiment of the invention allows for greater efficiency manufacture of reaction chambers and inflator devices. In addition, the same modular reaction chamber can be incorporated into more than one type of inflator device, thereby allowing for the assembly of more than one type of inflator device, e.g., first stage passenger, second stage passenger and single stage driver, on the same production line with similar or the same tooling. Customer specific operations can be moved to the final assembly stage from the reaction housing production stage(s), thereby reducing production line changeovers.

The inflator device of the invention also provides a filter that is disposed outside of the reaction chamber(s). Such an external filter of the inflator device of the invention provides for less free volume and reduced thermal mass inside the reaction chamber, and allows ignition with a reactable booster material in a lesser relative amount than is generally common in current commercial inflator devices. This booster material can be included as a relatively small secondary charge. Alternatively, as discussed below, a relatively larger initiator device can be employed. Also, higher reaction pressures upon actuation can generally be confined to the reaction chamber(s), so that the filter housing endures generally lower pressures, thereby allowing for an inflator device of generally lesser weight as only the reaction housing(s) may be required to be designed to withstand the higher internal pressures.

The inflator device of one embodiment of the invention also desirably provides a thrust neutral discharge at discharge stages both within, e.g., from one chamber to the next, and from the inflator device. The internal reaction chambers and the inflator device include radial discharge openings disposed in a thrust neutral array. The relatively large openings of the filter housing of the invention desirably provide a more diffused, and thus a lower velocity, inflation gas flow. Additional benefits of the inflator device of the invention include reduced noise production during deployment, improved effluents, and less particulate, such as pieces of ruptured foil seals, entering the inflatable cushion.

Figure 1:
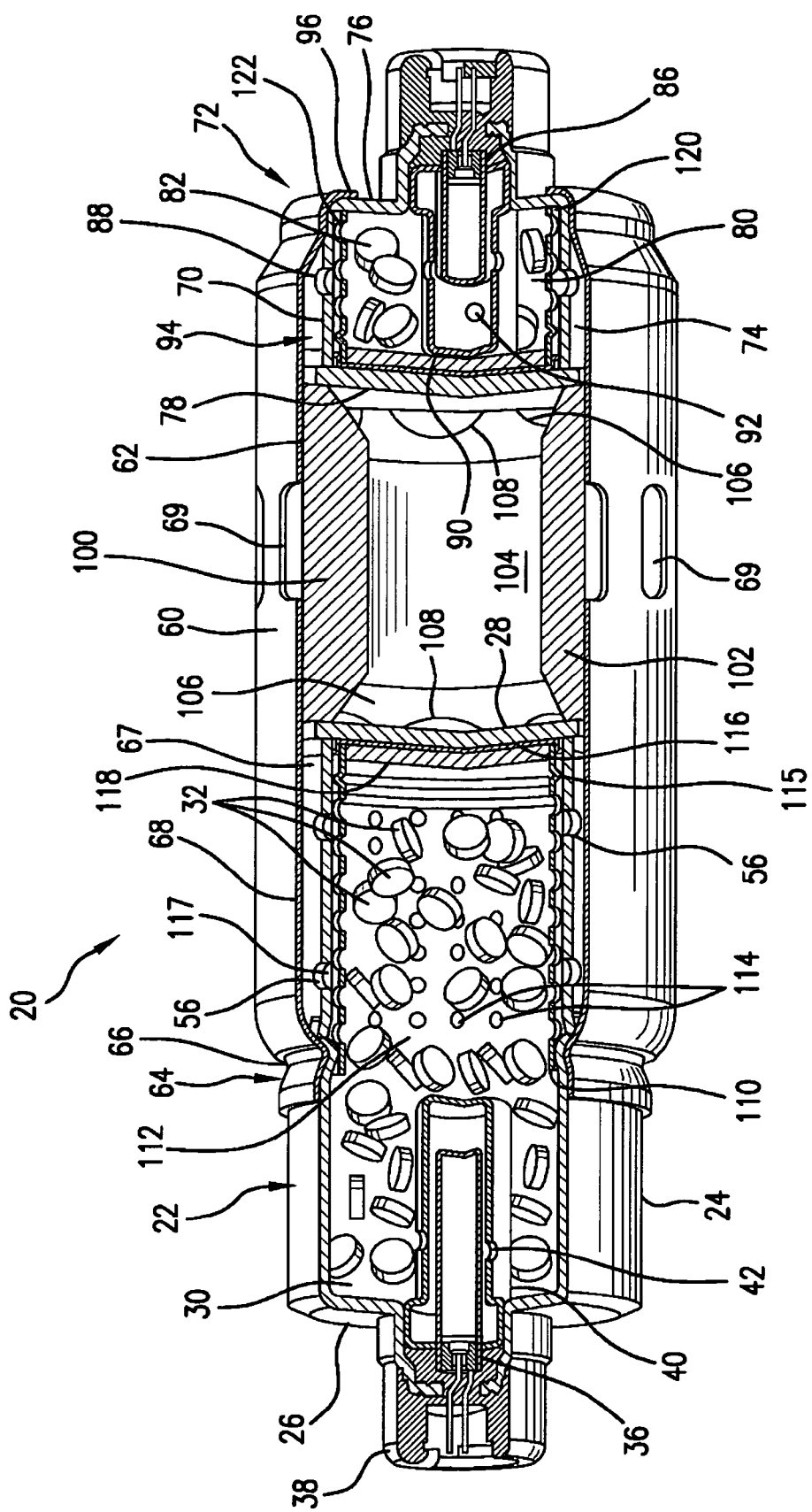
FIGS. 1-4 show an inflator device for inflating an inflatable cushion of a side inflatable cushion restraint system in accordance with one embodiment of the invention.
Figure 2:
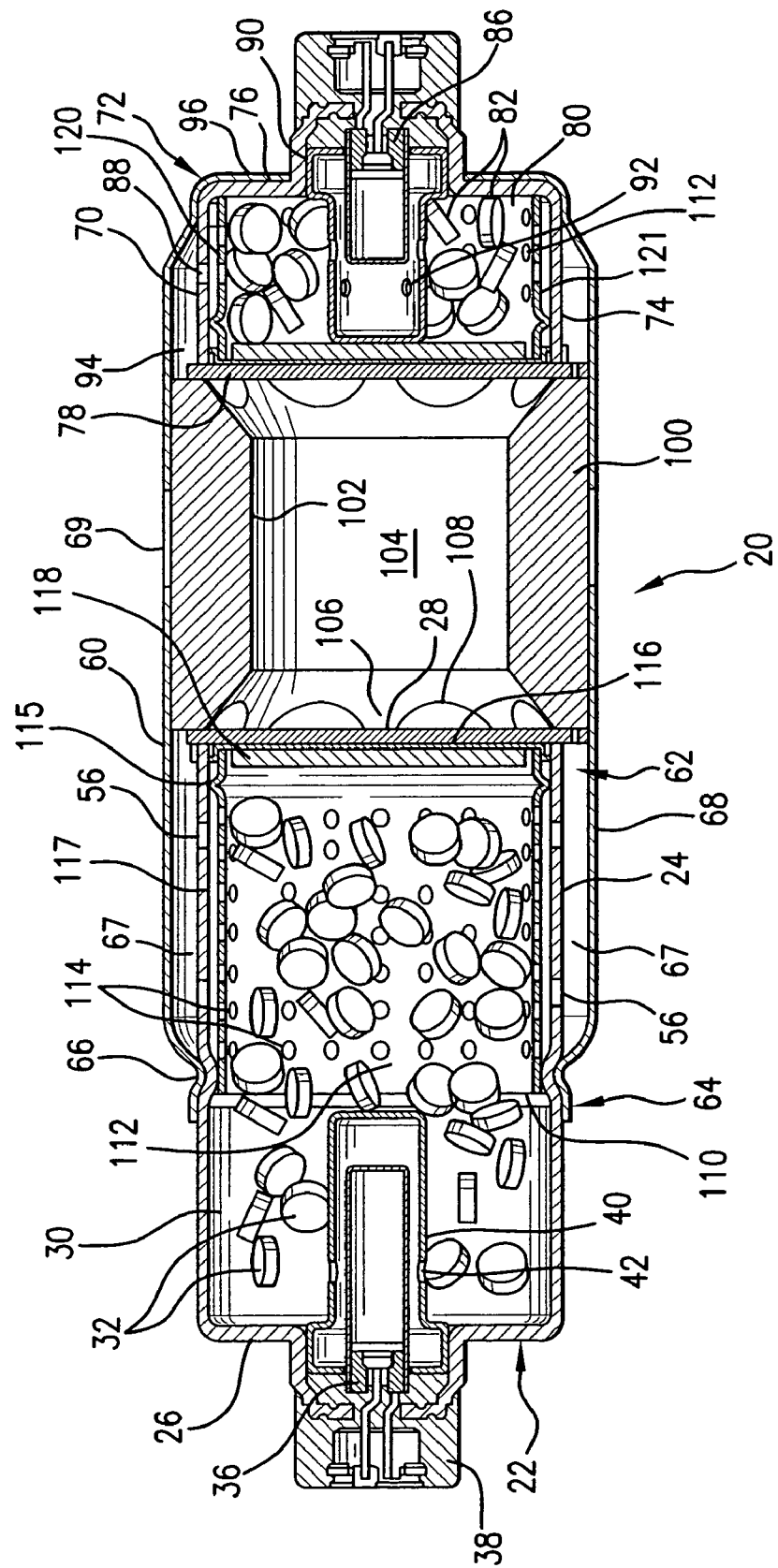
Figure 3:
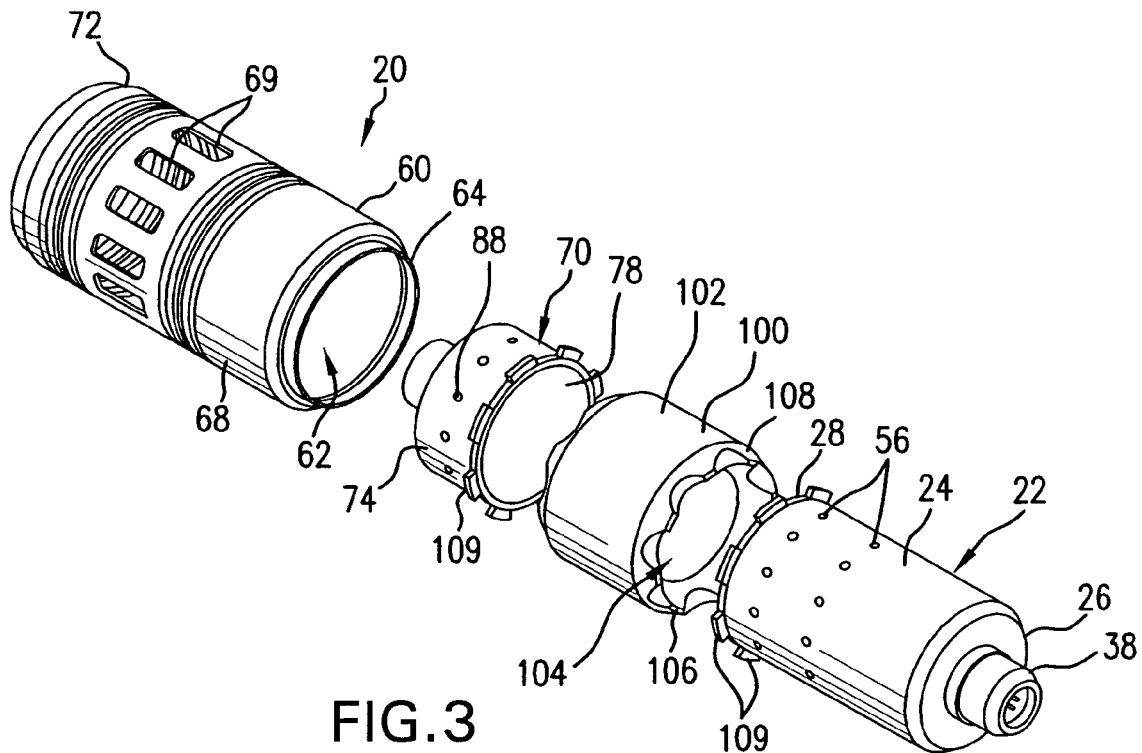

FIGS. 1-3 show an inflator device 20 for inflating an inflatable cushion of an inflatable cushion restraint system, such as a passenger side inflatable cushion restraint system. The inflator device 20 includes a first reaction housing 22 having a reaction housing side wall 24, a reaction housing first end wall 26 adjacent the side wall 24, and a reaction housing second end wall 28 adjacent the side wall 24 and opposite the reaction housing first end wall 26. The reaction housing second end wall 28 is desirably welded, e.g., friction welded, to the reaction housing side wall 24. The reaction housing 22 defines a reaction chamber 30 containing a first supply of gas generant material 32. The supply of gas generant material can generally be any type and form known and available to those skilled in the art, such as tablets shown in FIGS. 1-2, wafers, granules, and combinations thereof, for example.

An initiator device 36, such as is known and available to those skilled in the art, is connected at or to the reaction housing first end wall 26. The initiator device 36 is in reaction initiating communication with the supply of gas generant material 32, such that upon the initiator device 36 receiving an actuating electrical signal, the initiator device 36 produces a reaction product that actuates the gas generant material 32 to produce inflation gas for inflating an inflatable cushion (not shown). In the embodiment shown in FIGS. 1-3, the initiator device 36 is desirably connected to the first end wall 26 by an injected molded material or adapter 38. The molded adapter 38 desirably provides a relatively low cost, repeatable connection that is desirably generally free of metal slivers and burrs that are often present with machined components.

An initiator diffuser 40 is disposed between the initiator device 36 and the supply of gas generant material 32. The initiator diffuser 40 includes a plurality of radially oriented diffuser discharge openings 42 disposed in discharge orientation toward the reaction housing side wall 24. As described above, "discharge orientation" refers to a positioning of an opening toward an element such that a reaction product or inflation gas discharging through the opening is generally discharged in a direction toward the element. As will be appreciated by those skilled in the art following the teachings herein provided, various sizes, shapes and configurations are available for the initiator diffuser and the radially oriented diffuser discharge openings of the invention. The initiator diffuser 40 in the illustrated embodiment is desirably press fit into place. The initiator diffuser 40 desirably shields the gas generant 32 from the reaction of the initiator device 36, thereby reducing or eliminating any breakage of the gas generant material tablets 32 and providing a more repeatable ignition. Generally, gas generant tablet or wafer breakage can affect the inflation gas production performance, due to increased surface area of the gas generant material.

The inflator device of the invention has a lightweight tubular design. In one embodiment of the invention, the inflator device has a length (e.g., generally measured from the first end of the first reaction housing to the opposing first end of the second reaction housing) to diameter ratio of about 3:1. In one particularly preferred embodiment, the inflator device has a length of about 110 mm to about 210 mm, and desirably about 165 mm, and a diameter (measured at a point of greatest width) of about 45 mm to about 65 mm, and desirably about 50 mm. In one embodiment of the invention, most components of the inflator device are formed of stamped steel, thereby reducing or eliminating the need for machined parts and providing robust and easily repeatable components.

Figure 4:
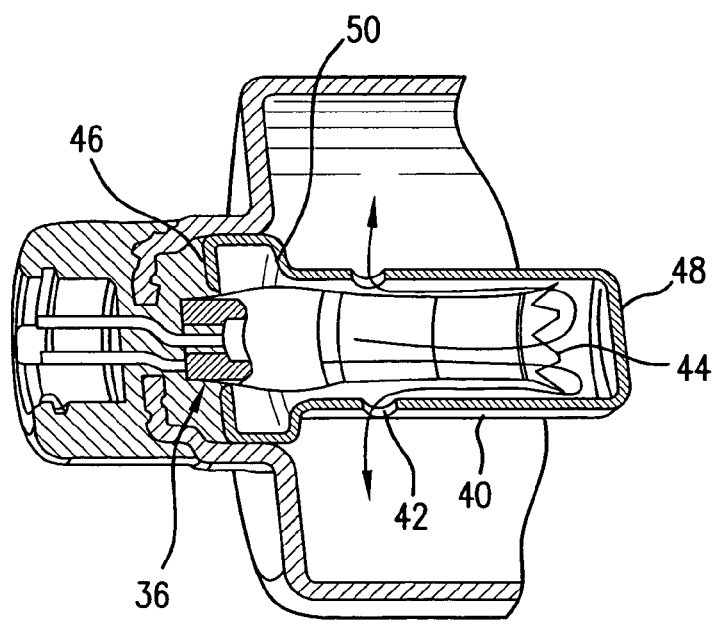

FIG. 4 illustrates the initiator device 36 upon receiving an electrical signal. An end 44 ruptures and the reaction products discharge through the radially oriented diffuser discharge openings 42 as indicated by the arrows. The initiator diffuser contains the rupturing of the initiator device 36 at initiator cup end 44, thereby protecting the gas generant tablets 32 from breaking. The initiator diffuser 40 shown in FIGS. 1-4 includes a necked end 46 that is useful to offset pressure against opposing end 48. As shown in FIG. 4, the initiator diffuser 40 provides lateral support for the bulging initiator cup 50 to promote rupture at end 44. The long flow path of the reaction product(s) helps ensure complete reaction of the charge material of the initiator device 36. In one embodiment of the invention, the initiator device 36 includes a longer cup portion 50 as compared to the typical presently available commercial initiator device, thereby allowing for the inclusion of more reactive material. In one embodiment of this invention, the initiator cup 50 has a length of about 14 mm to about 30 mm, and desirably about 29 mm, and a diameter of about 8 mm to about 12 mm, and desirably about 8 mm.

Referring to FIGS. 1-3, the reaction housing side wall 24 includes a plurality of radially oriented chamber discharge openings 56. Upon reaction initiation of the supply of gas generant material 32, the produced inflation gas discharges from the reaction chamber 30 through the discharge openings 56. Those skilled in the art and guided by the teachings herein provided will appreciate that various sizes, shapes and configurations are available for the reaction housings and the radially oriented chamber discharge openings of the invention, and can be suitably selected for particular applications.

The inflator device 20 includes an elongated cylindrical filter housing 60 in part defining a filter chamber 62. The first reaction housing 22 is disposed at a filter housing first end 64, and a portion of the first reaction housing 22 is disposed in the filter chamber 62 at or toward the filter housing first end 64. The chamber discharge openings 56 are also disposed within the filter chamber 62 such that the inflation gas is discharged into the filter chamber 62. The filter housing 60 is attached to the first reaction housing 22 by a circumferential crimp 66 in the filter housing 60. The portion of the first reaction housing side wall 24 within the filter chamber 62 is aligned with and spaced apart from a portion of the filter housing side wall 68 to form an inflation gas passage 67 therebetween. The filter housing side wall 68 includes a plurality of radially oriented inflation gas exit openings 69, through which inflation gas exits the inflator device 20 and enters an associated inflatable cushion (not shown). As will be appreciated by those skilled in the art following the teachings herein provided, various sizes, shapes and configurations are available for the filter housing and the inflation gas exit openings of the invention.

The inflator device shown in FIGS. 1-3 is an adaptive inflator device, and includes a second reaction housing 70 disposed at a filter housing second end 72 opposite the filter housing first end 64. The second reaction housing 70 is similar to the first reaction housing 22, but generally smaller in size. The second reaction housing 70 includes a second reaction housing side wall 74, a second reaction housing first end wall 76 adjacent the second reaction housing side wall 74, and a second reaction housing second end wall 78 adjacent the second reaction housing side wall 74 and opposite the second reaction housing first end wall 76. The second reaction housing defines a second reaction chamber 80 containing a second supply of gas generant material 82. A second initiator device 86 is connected at or to the second reaction housing first end wall 76. The second initiator device 86 is in reaction initiating communication with the second supply of gas generant material 82.

The second reaction housing side wall 74 also includes a plurality of radially oriented chamber discharge openings 88 that are positioned within the filter chamber 62. Upon reaction initiation of the second supply of gas generant material 82, the inflation gas discharges from the second reaction chamber 80 through the discharge openings 88. A second initiator diffuser 90 is disposed between the second initiator device 86 and the second supply of gas generant material 82. The second initiator diffuser 90 includes a plurality of radially oriented diffuser discharge openings 92 disposed in discharge orientation toward the second reaction housing side wall 74.

Similar to the first reaction housing 22 discussed above, a portion of the second reaction housing 70 is disposed within the filter chamber 62 and aligned with and spaced apart from a portion of the filter housing side wall 68 to form a second inflation gas passage 94 therebetween. The filter housing 60 shown in FIGS. 1-3 is secured within the second reaction housing 70 to and/or against a portion 96 wrapped around a portion of the second reaction housing end 76.

A filter element 100 is disposed within the filter chamber 62 and external of both the first and second reaction housings 22 and 70. The filter element 100 includes a tubular filter body 102 with a central passageway 104. The tubular filter body 102 includes a plurality of spacer protuberances 106 at each end of the tubular filter body 102. The plurality of spacer protuberances 106 are disposed adjacent the end walls 28 and 78 of the first and second reaction housings 22 and 70, respectively. Formed on both sides of each of the spacer protuberances 106 are scallop-shaped filter passageways 108 allowing or directing inflation gas to enter the central passageway 104. The filter body 102 can be formed of various and alternative materials known and available to those skilled in the art. In one preferred embodiment of the invention, the filter body 102 is formed of a compressed or wrapped metal wire mesh. As discussed above, the filter element 100 being disposed outside of both the first and second reaction housings 22 and 70 allows for less free volume and reduced thermal mass inside the reaction chambers 30 and 80, thereby allowing direct ignition with the relatively larger initiator devices 36 and 86.

The exploded view of the inflator device 20 shown in FIG. 3 illustrates how the inflator device 20 is assembled according to one preferred embodiment of the invention. The assembled second reaction housing 70 is inserted into the filter housing 60 through the first end 64 until it abuts the filter housing portion 96 shown in FIGS. 1 and 2. The filter element 100 is next inserted until the filter body spacer protuberances 106 abut the second reaction housing second end 78. The first reaction housing 22 is then inserted, and when the first reaction housing second end 28 abuts the filter element 100, the first reaction housing 22 is crimped into place. In one embodiment of the invention, the second reaction housing 70 is held against the filter housing portion 96 by the filter element 100. A plurality of tabs 109 are disposed around the edges of the end walls 28 and 78 of the first and second reaction housings 22 and 70, respectively, to maintain the desired spacing within the filter housing 60.

In the embodiment of the invention shown in FIGS. 1-3, the first reaction housing 22 includes a strainer element 110 therein. The strainer element 110 is disposed between the supply of gas generant material 32 and the plurality of radially oriented chamber discharge openings 56. The strainer element 110 includes a strainer side wall 112 aligned with the reaction housing side wall 24. The strainer side wall 112 includes a plurality of strainer discharge openings 114. In one embodiment of the invention, none of the plurality of strainer discharge openings 114 are directly aligned with, or in direct discharge orientation with, any of the chamber discharge openings 56. As seen in FIGS. 1 and 2, the strainer discharge openings 114 are in discharge orientation with the reaction housing wall 24, thereby not providing a direct or straight inflation gas discharge route to the filter chamber passage 67. The strainer element 110 of the invention aids in providing a diffused inflation gas flow, and also assists in reducing or eliminating any particulate discharge from the reaction housing 22. A crimped rib or shoulder 115 in the strainer side wall 112 is used to maintain the proper spacing between the strainer side wall 112 and the first reaction housing side wall 24.

The strainer element 110 includes a strainer end wall 116 at an end of the strainer side wall 112 and adjacent the first reaction housing end wall 28. A damper pad 118 is desirably disposed between the strainer end wall 116 and the supply of gas generant material 32. A rupturable sealing member, such as is known to those skilled in the art, can be disposed on either side of the strainer side wall 112 and over the strainer discharge openings 114, such as metal foil sealing member 117 disposed between the strainer element 110 and the reaction housing side wall 24, to seal the gas generant material 32 from the ambient environment before actuation. One or more rupturable sealing members can alternatively be placed over the chamber discharge openings 56. A second strainer element 120 and a second rupturable seal 121 is contained in the second reaction housing 70. The second strainer element 120 is similar to the first strainer element 110, and varies in size and the number of strainer discharge openings 122. As will be appreciated by those skilled in the art following the teachings herein provided, various and alternative sizes, shapes and configurations are available for the strainer elements and strainer discharge openings of the invention.

Figure 5:
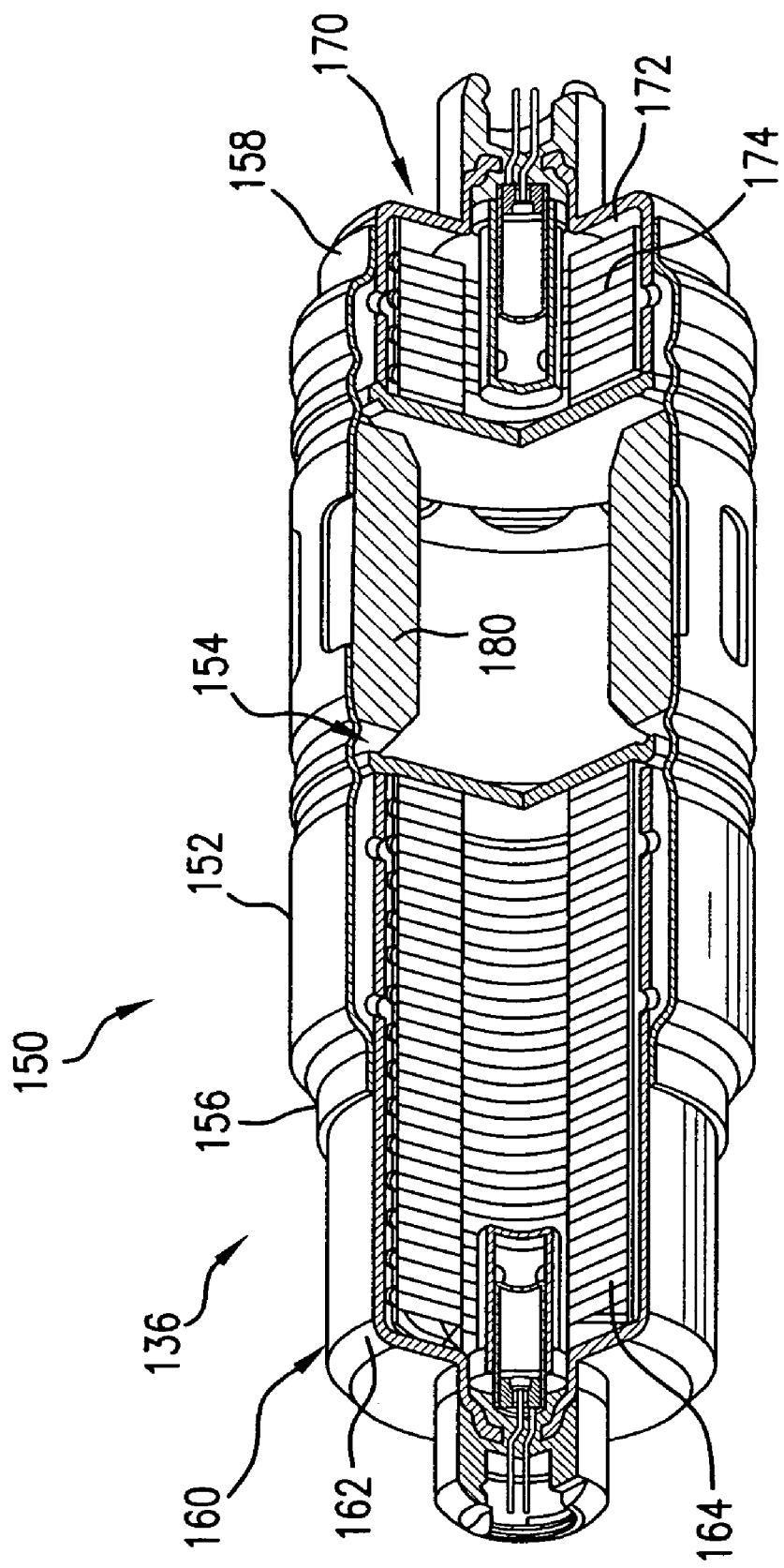
FIG. 5 is a sectional view of an inflator device according to another embodiment of the invention.

FIG. 5 is a sectional view of an adaptive inflator device 150 according to another embodiment of the invention. The inflator device 150 includes a filter housing 152 in part defining a filter chamber 154. A first reaction housing 160 defining a first reaction chamber 162 is disposed at a filter housing first end 156 and at least a portion of the first reaction housing 160 is disposed in the filter chamber 154 at or toward the filter housing first end 156. A second reaction housing 170 defining a second reaction chamber 172 is disposed at a filter housing second end 158, and at least a portion of the second reaction housing 170 is disposed in the filter chamber 154 at the filter housing second end 158. Each of the first and second reaction housings 160 and 170 include a wafer form of gas generant material 164 and 174, respectively. A filter element 180 is disposed in the filter chamber 154, external and between the first and second reaction housings 160 and 170.

Figure 6:
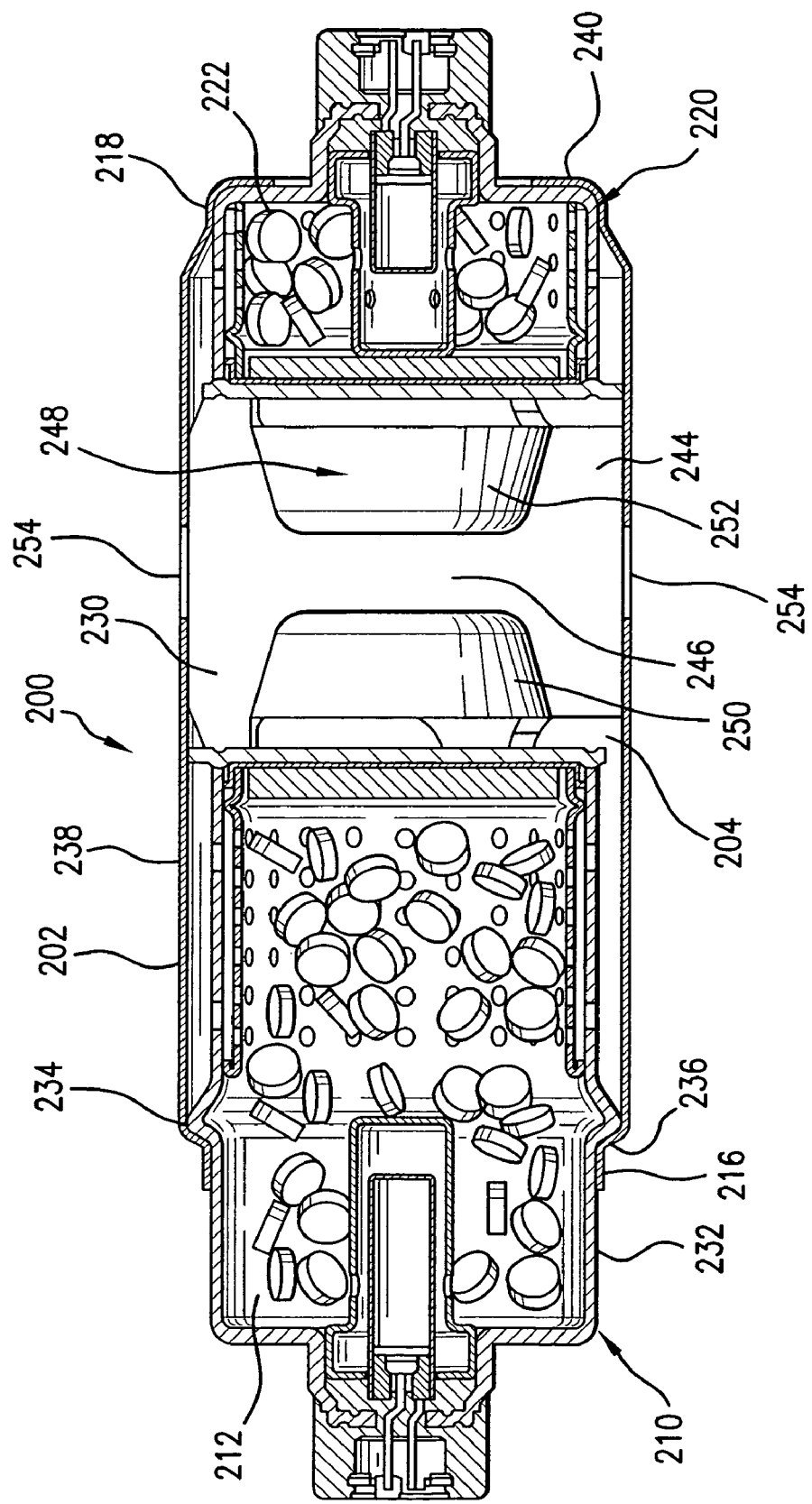
FIG. 6 is a sectional view of an inflator device according to yet another embodiment of the invention.

FIG. 6 is a sectional view of an adaptive inflator device 200 according to another embodiment of the invention. The inflator device 200 is generally similar to the inflator device 20 discussed above with reference to FIGS. 1-3. The inflator device 200 in FIG. 6 includes a filter housing 202 in part defining a filter chamber 204. A first reaction housing 210 defining a first reaction chamber 212 is disposed at a filter housing first end 216, and at least a portion of the first reaction housing 210 is disposed in the filter chamber 204 at or toward the filter housing first end 216. A second reaction housing 220 defining a second reaction chamber 222 is disposed at a filter housing second end 218. A filter element 230 is disposed in the filter chamber 204, external and between the first and second reaction housings 210 and 220.

The first reaction housing 210 includes a reaction housing side wall 232. The reaction housing side wall 232 includes a circumferential shoulder 234 extending outward therefrom. The filter housing 202 is attached or secured to the first reaction housing 210 by a circumferential crimp 236 in the filter housing side wall 238. In the embodiment shown in FIG. 6, the crimp is disposed adjacent the shoulder 234. The crimp 236 secures the first reaction housing against the filter element 230, which, in turn, is secured against the second reaction housing 220, which, in turn, is abutting an end portion 240 of the filter housing second end 218. The shoulder 234 generally and desirably provides for a more secure connection to the filter housing 202, as compared to the crimp 66 shown in FIG. 1-3 without such a shoulder.

The filter element 230 includes a tubular filter body 244 including a wall 246 disposed across a central passageway 248. The wall 246 divides the central passageway 248 into two portions 250 and 252. The wall 246 is desirably made from the same material as the tubular filter body 244, e.g., compressed knitted wire. In one embodiment of the invention, the wall 246 is compressed to form a solid center wall 246, such that inflation gas cannot pass through the wall 246, and is thus directed through the tubular filter body 244 and out inflation gas exit openings 254.

Figure 7:
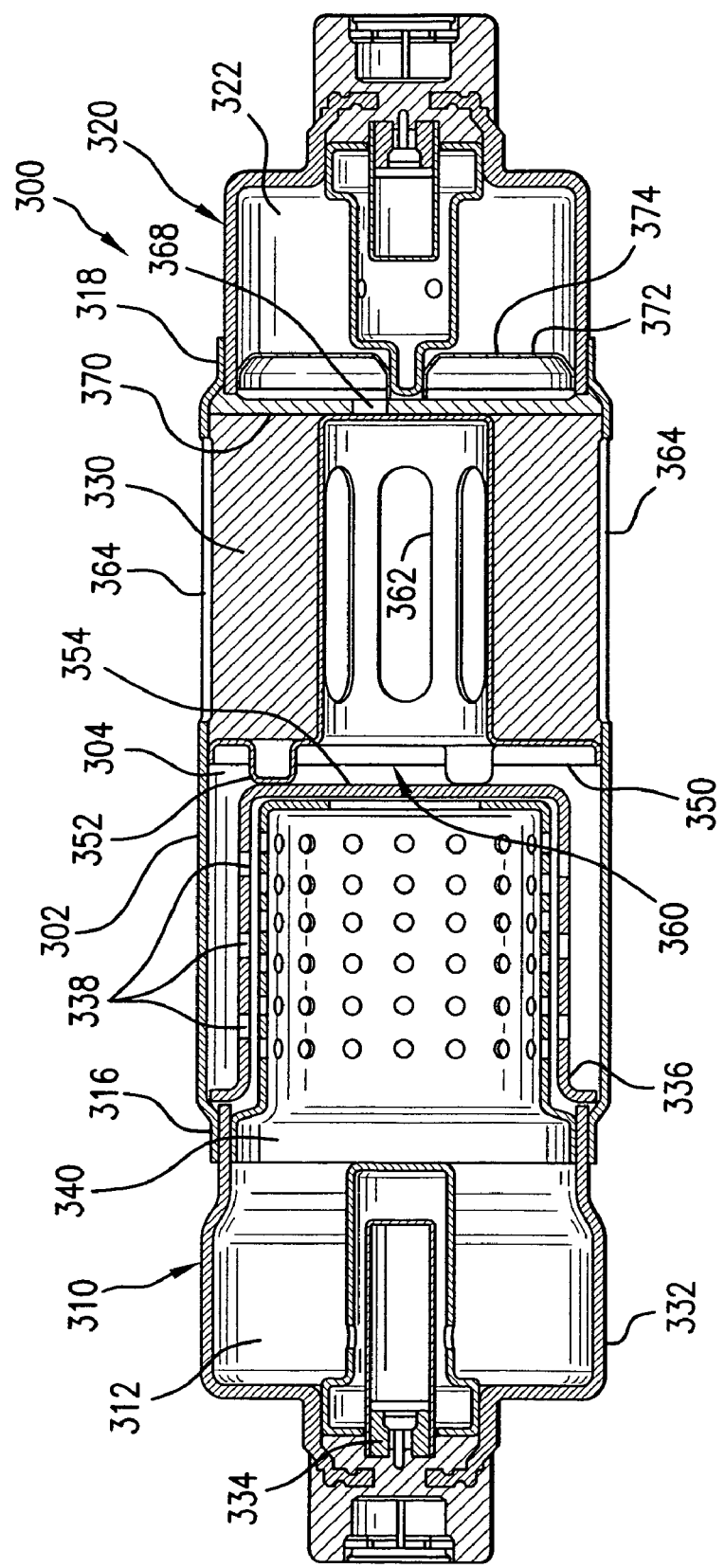
FIG. 7 is a sectional view of an inflator device according to still yet another embodiment of the invention.

FIG. 7 is a sectional view of an adaptive inflator device 300 according to yet another embodiment of the invention. The inflator device 300 includes a filter housing 302 in part defining a filter chamber 304. A first reaction housing 310 defining a first reaction chamber 312 is disposed at a filter housing first end 316, and at least a portion of the first reaction housing 310 is disposed in the filter chamber 304 at or toward the filter housing first end 316. A second reaction housing 320 defining a second reaction chamber 322 is disposed at a filter housing second end 318. A filter element 330 is disposed in the filter chamber 304, external and between the first and second reaction housings 310 and 320. In the embodiment of FIG. 7, the first reaction housing 310 is formed from a first portion 332 including a first initiator device 334 and a second portion 336 including a plurality of chamber discharge openings 338 and disposed within the filter chamber 304. The first portion 332 and the second portion 336 are welded to each other. The filter housing 302 is crimped or otherwise attached to the reaction housing 310 at or around the filter housing first end 316. A strainer element 340 is press fit within the first portion 332.

The filter element 330 does not itself have spacer protuberances. The filter element 330 is formed of cylindrical wound mesh and ceramic paper, and is used in combination with a filter support element 350. The filter support element 350 includes spacer protuberances 352 in contact with and spacing the filter element 330 from an end 354 of the first reaction housing second portion 336. Inflation gas from actuated gas generant material (not shown) exits the first reaction chamber 310 through the chamber discharge openings 338 and flows into a central passage 360 of the filter support element 350, through filter support element discharge openings 362, through the filter element 330, and out radially oriented inflation gas exit openings 364.

In the embodiment shown in FIG. 7, the second reaction housing 320 includes a chamber discharge opening 368 in a second reaction housing end 370. The second reaction housing includes a strainer element 372 adjacent the second reaction housing end 370 with strainer discharge openings 374. As discussed above with reference to FIGS. 1-3, the strainer discharge openings shown in FIG. 7 are not in direct alignment or direct discharge orientation with any chamber discharge openings, thereby providing a diffused flow.

Figure 8:
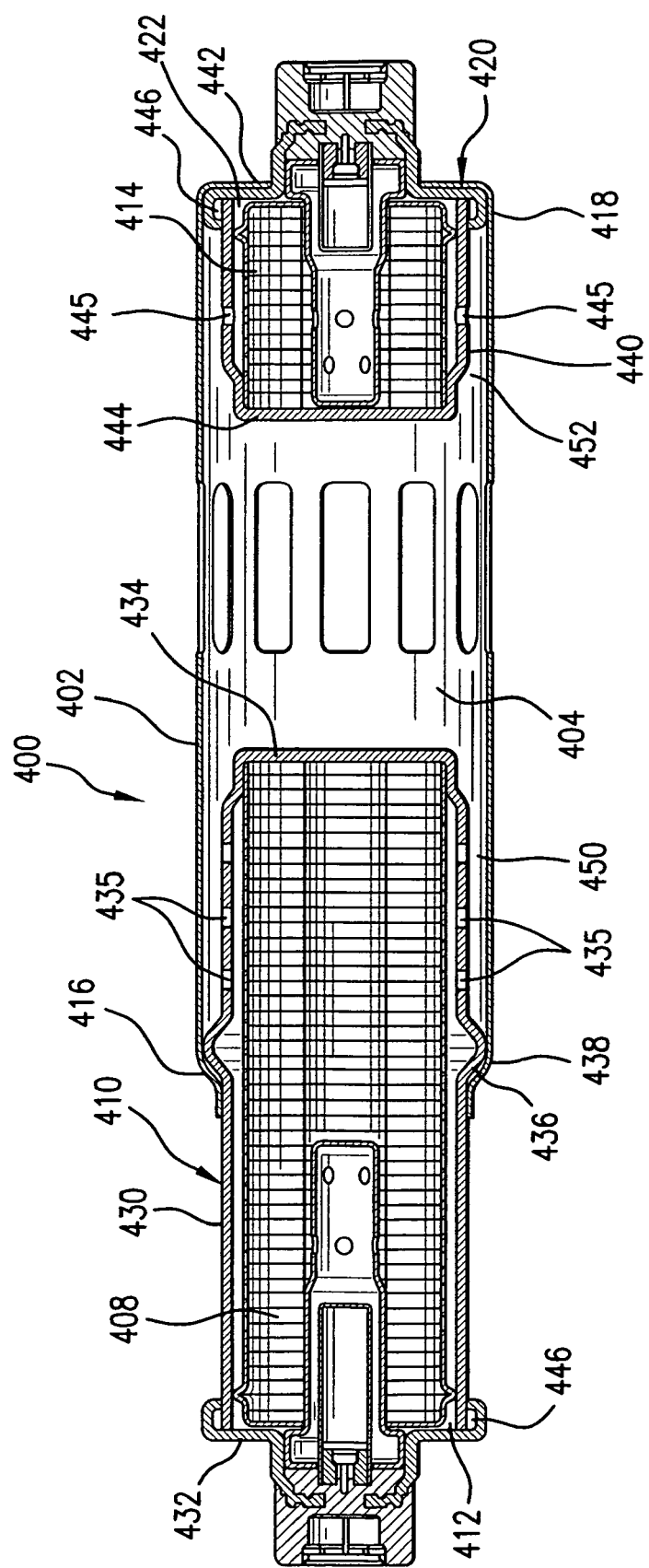
FIG. 8 is an inflator device according to yet another embodiment of the invention.

FIG. 8 illustrates an adaptive inflator device 400 according to another embodiment of the invention. The inflator device 400 includes a filter housing 402 in part defining a filter chamber 404. A first reaction housing 410 defining a first reaction chamber 412 containing a first supply of gas generant material 408 is disposed at a filter housing first end 416, and at least a portion of the first reaction housing 410 is disposed in the filter chamber 404 at or toward the filter housing first end 416. A second reaction housing 420 defining a second reaction chamber 422 containing a second supply of gas generant material 414 is disposed at a filter housing second end 418 and partially in the filter chamber 404. Any of the filter elements discussed herein can be used between and external the first and second reaction housings 410 and 420.

The first reaction housing 410 includes a reaction housing side wall 430, a reaction housing first end wall 432 adjacent the side wall 430, and a reaction housing second end wall 434 adjacent the side wall 430 and opposite the reaction housing first end wall 432. The reaction housing side wall 430 includes a plurality of radially oriented chamber discharge openings 435. The reaction housing side wall 430 includes a circumferential shoulder 436 extending outward therefrom. The filter housing 402 is attached or secured to the first reaction housing 410 by a circumferential crimp 438 in the filter housing 402 adjacent the shoulder 436.

The second reaction housing 420 includes a reaction housing side wall 440, a reaction housing first end wall 442 adjacent the side wall 440, and a reaction housing second end wall 444 adjacent the side wall 440 and opposite the reaction housing first end wall 442. The second reaction housing side wall 440 also includes a plurality of radially oriented chamber discharge openings 445.

In the embodiment of FIG. 8, the first reaction housing first end wall 432 is attached to the side wall 430 by a weld 446. Similarly, the second reaction housing first end wall 442 is attached to the side wall 440 by a weld 448. Welding the reaction housing first end walls 432 and 442 to the side walls 430 and 440, respectively, instead of welding the reaction housing second end walls 434 and 444, such as shown in FIGS. 1-3, can desirably improve gas flow through the inflation gas passages 450 and 452, respectively, as a protrusion potentially resulting from the weld is not disposed in the inflation gas flow path.

Thus, the invention provides a modular inflator device for improving manufacturing efficiency and reducing manufacturing costs. The inflator device of the invention provides a diffused lower velocity gas flow, by directing the reaction product and/or inflation gas flow through one or more change of directions before exiting the inflator device. By moving the filter outside the reaction chambers, the inflator device can incorporate direct ignition of the gas generant material using larger initiators in combination with an initiator diffuser.

As will be appreciated by those skilled in the art following the teachings herein provided, various and alternative sizes, shapes and configurations are available for the various components of the invention. The invention illustratively disclosed herein suitably may be practiced in the absence of any element, part, step, component, or ingredient which is not specifically disclosed herein.

While in the foregoing detailed description the invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. In an inflator device for inflating an inflatable cushion of an inflatable cushion restraint system, the inflator device having an elongated cylindrical configuration and including a supply of gas generant material to produce inflation gas upon reaction initiation, the improvement comprising:
   a reaction housing including a reaction housing side wall, a reaction housing first end wall adjacent the side wall, and a reaction housing second end wall adjacent the side wall and opposite the reaction housing first end wall, the reaction housing defining a reaction chamber containing the supply of gas generant material;
   an initiator device connected to reaction housing first end wall, the initiator device in reaction initiating communication with the supply of gas generant material;
   the reaction housing side wall including a plurality of radially oriented chamber discharge openings, wherein upon reaction initiation of the supply of gas generant material, the inflation gas discharges from the reaction chamber through the discharge openings;
   an initiator diffuser disposed between the initiator device and the supply of gas generant material, the initiator diffuser including a plurality of radially oriented diffuser discharge openings disposed in discharge orientation toward the reaction housing side wall;
   a filter housing at least in part defining a filter chamber, at least a portion of the reaction housing and the chamber discharge openings disposed within the filter chamber; and
   a filter element disposed in the filter chamber and external of the reaction housing.

2. The inflator device according to claim 1 wherein the supply of gas generant material comprises a form selected from the group consisting of tablets, wafers, granules, and combinations thereof.

3. The inflator device according to claim 1, wherein the reaction housing is a first reaction housing, and the inflator device additionally comprises:
   a second reaction housing including a second reaction housing side wall, a second reaction housing first end wall adjacent the second reaction housing side wall, and a second reaction housing second end wall adjacent the second reaction housing side wall and opposite the second reaction housing first end wall, the second reaction housing defining a second reaction chamber containing a second supply of gas generant material;
   a second initiator device connected to the second reaction housing first end wall, the second initiator device in reaction initiating communication with the second supply of gas generant material;
   the second reaction housing side wall including a plurality of radially oriented chamber discharge openings, wherein upon reaction initiation of the second supply of gas generant material, the inflation gas discharges from the second reaction chamber through the discharge openings;

a second initiator diffuser disposed between the second initiator device and the second supply of gas generant material, the second initiator diffuser including a plurality of radially oriented diffuser discharge openings disposed in discharge orientation toward the second reaction housing side wall;

at least a portion of the second reaction housing and the chamber discharge openings disposed within the filter chamber and at an end of the filter chamber opposite the first reaction housing, wherein the filter element is external of the second reaction housing.

4. The inflator device according to claim 1 wherein the filter element comprises:
   a tubular filter body including a central passageway; and
   a plurality of spacer protuberances at an end of the tubular filter body, at least one of the plurality of spacer protuberances disposed adjacent the second reaction housing end wall.

5. The inflator device according to claim 4 wherein the tubular filter body comprises a wall disposed across the central passageway and dividing the central passageway.

6. The inflator device according to claim 1 wherein the filter housing is attached to the reaction housing by a circumferential crimp in the filter housing.

7. The inflator device according to claim 6 wherein the reaction housing side wall comprises a shoulder, and the crimp is disposed adjacent the shoulder.

8. The inflator device according to claim 1, wherein the filter element includes a central passageway, and further comprising:
   a filter support element extending at least partially into the central passageway, the filter support element including spacer protuberances in contact with, and spacing the filter element from, the second end wall of the reaction housing.

9. The inflator device according to claim 1 additionally comprising:
   a strainer element disposed within the reaction housing and between at least a portion of the supply of gas generant material and the radially oriented chamber discharge openings, the strainer element comprising a strainer side wall aligned with the reaction housing side wall, the strainer side wall including a plurality of strainer discharge openings.

10. In an inflator device for inflating an inflatable cushion of an inflatable cushion restraint system, the inflator device having an elongated cylindrical configuration and including a supply of gas generant material to produce inflation gas upon reaction initiation, the improvement comprising:
    a reaction housing including a reaction housing side wall, a reaction housing first end wall adjacent the side wall, and a reaction housing second end wall adjacent the side wall and opposite the reaction housing first end wall, the reaction housing defining a reaction chamber containing the supply of gas generant material;
    an initiator device connected to reaction housing first end wall, the initiator device in reaction initiating communication with the supply of gas generant material;
    the reaction housing side wall including a plurality of radially oriented chamber discharge openings, wherein upon reaction initiation of the supply of gas generant material, the inflation gas discharges from the reaction chamber through the discharge openings;
    an initiator diffuser disposed between the initiator device and the supply of gas generant material, the initiator diffuser including a plurality of radially oriented diffuser discharge openings disposed in discharge orientation toward the reaction housing side wall; and
    a strainer element disposed within the reaction housing and between the supply of gas generant material and the plurality of radially oriented chamber discharge openings, the strainer element comprising a strainer side wall aligned with the reaction housing side wall and including a plurality of strainer discharge openings.

11. The inflator device according to claim 10 wherein the strainer element additionally comprises a strainer end wall at an end of the strainer side wall and adjacent the second reaction housing end wall, and additionally comprising a damper pad disposed between the strainer end wall and the supply of gas generant material.

12. The inflator device according to claim 10 additionally comprising a sealing member disposed between the strainer element and the reaction housing side wall.

13. The inflator device according to claim 10 additionally comprising:
    a filter housing at least in part defining a filter chamber, at least a portion of the reaction housing and the chamber discharge openings disposed within the filter chamber; and
    a filter element disposed in the filter chamber and external of the reaction housing.

14. An inflator device for an inflatable cushion restraint system, the inflator device comprising:
    a filter housing including a filter housing side wall, a filter housing first end, and a filter housing second end opposite the filter housing first end, the filter housing at least in part defining a filter chamber;
    a first reaction housing defining a first reaction chamber containing a first supply of gas generant material, the first reaction housing disposed at the filter housing first end and at least a portion of the first reaction housing disposed in the filter chamber at the filter housing first end;
    a first initiator device in reaction initiating communication with the first supply of gas generant material;
    a second reaction housing defining a second reaction chamber containing a second supply of gas generant material, the second reaction housing disposed at the filter housing second end and at least a portion of the second reaction housing disposed in the filter chamber at the filter housing second end;
    a second initiator device in reaction initiating communication with the second supply of gas generant material;
    a filter element disposed in the filter chamber and external and between the first and second reaction housings;
    the first reaction housing including a portion of a first reaction housing side wall aligned with and spaced apart from a portion of the filter housing side wall to form an inflation gas passage therebetween, the portion of the first reaction housing side wall including a plurality of radially oriented discharge openings connecting the first reaction chamber and the inflation gas passage, wherein upon reaction initiation of the first supply of gas generant material to produce inflation gas, the inflation gas exits the first reaction chamber through the discharge openings, enters the inflation gas passage, and passes through the filter element;
    the inflator device additionally comprising a strainer element within the first reaction chamber and between the first supply of gas generant material and the plurality of radially oriented discharge openings, the strainer element comprising a strainer side wall aligned with the first reaction housing side wall and including a plurality of strainer discharge openings.

15. The inflator device according to claim 14 wherein the filter element comprises:
 a tubular filter body including a central passageway; and
 a first plurality of spacer protuberances at a first end of the tubular filter body, at least one of the first plurality of spacer protuberances disposed adjacent a housing end wall of the first reaction housing; and
 a second plurality of spacer protuberances at a second end of the tubular filter body opposite the first end, at least one of the second plurality of spacer protuberances disposed adjacent a housing end wall of the second reaction housing.

16. The inflator device according to claim 15 wherein the tubular filter comprises a wall disposed across the central passageway and dividing the central passageway.

17. The inflator device according to claim 14 wherein the filter housing is attached to each if the first and second reaction housings by a circumferential crimp in the filter housing.

18. The inflator device according to claim 17 wherein the first reaction housing side wall comprises a circumferential shoulder, and the crimp is disposed adjacent the shoulder.

19. The inflator device according to claim 14 wherein the strainer element additionally comprises a strainer end wall at an end of the strainer side wall and adjacent the second reaction housing end wall, and additionally comprising a damper pad disposed between the strainer end wall and the supply of gas generant material.

20. The inflator device according to claim 14 additionally comprising a sealing member disposed between the strainer element and the reaction housing side wall.

* * * * *